United States Patent Office 3,758,317
Patented Sept. 11, 1973

3,758,317
MONOLITHIC INORGANIC STRUCTURES
Earl P. Moore, Jr., Wilmington, and Donald M. Sowards, Claymont, Del., assignors to E. I. du Pont de Nemours and Company, Wilmington, Del.
No Drawing. Filed May 20, 1971, Ser. No. 145,533
Int. Cl. C04b 35/14
U.S. Cl. 106—65       15 Claims

ABSTRACT OF THE DISCLOSURE

Monolithic inorganic structures of positively charged colloidal particles and negatively charged colloidal silica particles are formed by combining a negatively charged colloidal silica dispersion and a positively charged colloidal dispersion.

Particulate or fibrous refractory materials can be included in the positive and negative sols to contribute bulk, reinforcement and other physical properties to monolithic structures.

Compositions which vary in physical characteristics from fluid to plastic to rigid can be produced and are particularly suitable for adhesives, coatings, shaped refractories, and refractory molds.

BACKGROUND OF THE INVENTION

This invention relates to a unique process for forming monolithic inorganic structures. The process is useful for a variety of purposes but it was developed for and is particularly suited to the production of adhesives, coatings, shaped refractories and refractory molds.

These products differ broadly in their physical characteristics and with regard to the techniques and methods of preparation.

In current systems for manufacturing inorganic monolithic products of the above types, difficulty is often experienced in arriving at desired properties accurately and reproducibly. Many systems are based upon use of a colloidal silica sol or ethyl silicate or sodium silicate solution and a solid, liquid or gaseous chemical setting agent. Here, there is little control possible over rheological properties of mixtures (viscosity, thixotropy, etc.), working life, set or gel times, physical properties such as wet, green and fired strengths, and handling characteristics.

The activity of chemical setting agents is often unpredictable and hard to regulate. Amounts of setting agents must be measured extremely precisely if mixtures other than gels are desired. Thus, to obtain specific rheological properties ranging from fluid to plastic to rigid and working life of seconds to perhaps months, as required, is virtually impossible. Also, chemical setting agents many times contribute nothing to the binding of filler materials and may detract from strength.

Other current systems use additives such as polymers, clays, gums, etc. to give desired rheological properties (green strength, plasticity, etc.). Additives, however, frequently detract from other important properties (cure time, strength, etc.).

Other current systems involve the use of an acidic and a basic reagent where both are binders. For example, acidified silica sol and basic silica sol are interacted. However, gellation is slow and the resulting products are weak, and the system would not be useful where rapid setting of a composition is required. Also, it is not possible to regulate this system to give products of viscosities short of gels. In other examples, sodium silicate is reacted with acidified silica sol or ethyl silicate. Here, again there is no control over product rheology and sodium silicate detracts from refractory properties.

In the present invention, two oppositely charged agents which have high binding efficiency are combined in homogeneous fashion in compositions. These agents can be combined to give a broad spectrum of mixture properties and working lives: rapid forming, still gels to slow curing, fluid-to-plastic compositions to non-curing, long-lived compositions are possible.

SUMMARY OF THE INVENTION

The homogeneous compositions of this invention contain negatively charged colloidal silica particles and positively charged colloidal particles. The ratio of positively charged colloidal particles to negatively charged colloidal silica particles in these compositions is from 1:2 to 6.5:1. These compositions are formed by combining a sol of positively charged colloidal particles and a sol of negatively charged colloidal silica particles. This invention includes both the monolithic inorganic structures made of these compositions and the matrices of all of these monolithic structures in their wet state, i.e., before they are dried and further processed—e.g., fired, are the dispersions of aggregated species formed when positive and negative reagents interact. These dispersions vary in consistency from fluid to gel. Fluid to stiff mixtures, long-lived to very short-lived mixtures can readily be formulated to fit requirements. In a preferred embodiment, the positively charged colloid is alumina-coated colloidal silica.

These matrices can contain particulate or fibrous refractory material or metal as monolithic structures. The matrices serve as suspension media for these materials and contain the binders for these materials.

DESCRIPTION OF THE PREFERRED EMBODIMENTS

In one embodiment of this invention, the positive and negative components of the aggregate product—before or after particulate or fibrous filler or other additives are incorporated—are combined by hand mixing or mechanical stirring. These are mostly applications where products have appreciable shelf or working life.

In more complex embodiments, negative and positive reagent-based mixtures are rapidly combined and further processed according to a variety of techniques well known to the ceramic industry as well as methods common to plastics and metals technology. In these applications, brief working lives of product mixes are desired, that is, it is required that fast setting or gelling occur soon after mixing.

Using these techniques the mixed negative and positive components may be immediately cast, extruded, molded or otherwise shaped into simple or complex structures, sprayed, troweled or brushed as coatings on a variety of substrates or utilized as adhesives. The proportion of negative-to-positive agents as well as other variables can be utilized to tailor a composition to a given application.

COMPONENTS OF THE INVENTION

Negative silica

The negative silicas used in this invention can be divided into several classes based upon mode of manufacture. There are the amorphous silica powders prepared by flame hydrolysis of silica tetrachloride such as "Aerosil" 2491–380 (Degussa) and "Cab-O-Sil" EH–5 (Cabot Corporation), and by electric arc furnace vaporization of quartz such as Arc Silica 800 (Pittsburgh Plate Galss).

There are the particulate amorphous silicas prepared through precipitation from the liquid phase such as "Hi-Sil" 233 (Columbia-Southern Chemical Corporation), and "Quso" FF (Phiadelphia Quartz Company). The dry, uncharged amorphous powder particles, though high in surface area, are actually highly aggregated particles of silica of colloidal dimensions which do not break down when dispersed in water or other suitable medium. A negative charge forms on the surface of the particles when they are dispersed. The silicas can be mixed directly with dispersions or sols of the positively charged materials of this invention or they may be employed as dispersions in water or other suitable liquid media. Concentrations of silica employed in the processes of this invention can be as low as 1% and as high as 75% based upon the weight of sol or solution of positive material. It is preferred that the silica concentration be between 5% and 40% by weight.

There are negative silica sols which are substantially discrete, dense, non-agglomerated negatively charged colloidal particles dispersed in a suitable liquid medium. The concentration of silica in these sols can be as low as 5% and as high as 60% by weight. However, it is preferred that the silica content be at least 25% by weight. For the purposes of this invention, it is most preferred that the silica concentration be between 25% and 40% by weight. The silica sols are the preferred source of the negatively charged colloidal silica component of this invention.

The average diameter of the silica particles should be between about 1 and 150 millimicrons. It is preferred that the average silica particle diameter be in the range of 5–50 millimicrons and most preferred that it lie between 5 and 16 millimicrons.

The pH of the silica sol may range from 10.5 down to 7.5 or even lower with satisfactory results. The pH which is preferred is between 8.5 and 10, as in the commercial "Ludox" colloidal silica sols. Positively charged stabilizing counter ions for the colloidal silica particles in the sols are $Na^+$, as in "Ludox" LS, HS, SM, and AM, $NH_4^+$, as in "Ludox" AS, $K^+$, $Li^+$ and quaternary ammonium. Silica sols whose particle surfaces have been modified with metal oxides to enhance negative character, such as "Ludox" AM with aluminate-modified silica, are useful. The liquid medium for suspending the colloidal silica particles can be water, alone or mixed with low molecular weight water-miscible alcohols such as methanol and isopropanol or other polar organic liquids, or it can be one or more of these organic liquids free of water. The preferred medium for this invention is water.

Positive colloids

The positively charged colloidal particles used in this invention preferably are composed of a silica core coated with a polyvalent metal-oxygen compound. The acidic sols of these particles are fully described in U.S. Pat. 3,007,878. As indicated in this patent, the polyvalent metal-oxygen compound which can be used to provide a positive surface charge on colloidal silica particles can be any compound of the class of metal oxides, metal hydroxides and hydrated metal oxides of trivalent aluminum, chromium, gallium, indium and thallium or tetravalent titanium, zirconium, tin, cerium, hafnium, and thorium. For purposes of economics, it is preferred that the positive sol be an aqueous dispersion of alumina-coated colloidal silica particles of the type illustrated in FIG. 1 of U.S. Pat. 3,007,878.

An example of a charged alumina-coated silica sol which is particularly useful in this invention is one in which there is one mole of aluminum per mole of surface silica and which is prepared by a process described as follows:

264-lbs. of "Ludox" HS colloidal silica containing 40% $SiO_2$ by weight, the silica particles having an average particle size of 12–15 millimicrons and a specific surface area of about 215 m./g. $SiO_2$ is adjusted to pH 7.50 with 821 grams of 1:1 mixture of a concentrated hydrochloric acid in water. The sol is mixed with 62.8-lbs. of 50% chlorohydrol ($Al_2(OH)_5Cl$) and 61.7-lbs. of water by introducing it at a rate of 25-lbs. per minute into a centrifugal pump circulating the basic aluminum chloride solution. The clear fluid intermediate product is heated to 60° C. in ½-hour and at 60° C. for 2-hours, cooled to 20° C., and stirred with a Lightnin® mixer as well as circulated with the pump as 600-grams magnesium hydroxide dispersed in 1800-grams water is introduced in 5 minutes to bring the pH to 5.65. Agitation and circulation are continued for 2-hours. The clear stable product contains 26.4% $SiO_2$, 4.2% $Al_2O_3$, 1.5% Cl and 0.23% MgO. The mol ratio of aluminum to surface $SiO_2$ is 1:1. The pH of the product after several weeks aging is 4.60, the viscosity is 15 cps., and the specific gravity at 25° C. is 1.23. This product is referred to hereinafter as Positive Sol 130M.

Positive Sol 130M is stabilized by chloride ion. As described in U.S. Pat. 3,007,878 other anions, such as formate, acetate, lactate, nitrate, bromide, perchlorate bromate and trichloroacetate can be used instead of chloride.

Other positive sols can be used in this invention in place of the sol composed of colloidal silica particles coated with polyvalent metal-oxygen compound. In particular, a number of commercially available colloidal alumina sols can be used, such as dispersions of "Dispal" (Continental Oil Co.), "Alon" G (Cabot Corporation), and "Super-Ox" (Merkl Research Company).

By taking advantage of the chemical and physical behavior of the components of this invention and other variables, it is possible to regulate mixture character. Thus, it is possible to obtain compositions which vary in nature from soft and pliable with essentially unchanging physical properties to firm and intractable. The pH and concentration of the positive sol used, the concentration of the negative sol used, the type and amount of inert fillers added to the mixture, the ratio of positively charged particles to negatively charged particles and the type of mixing used in combining the ingredients of the composition of this invention all offer means to control the nature of the resulting product.

With increased percent $SiO_2$, silica sols useful in this invention tend to give products of higher viscosity due not only to a bulk effect but also to a higher concentration of reactive material available for reaction with positive colloid. Silica sols can have essentially no base present (e.g., silica produced by flame hydrolysis of silicon tetrachloride) or can have up to 0.5% or more (e.g., "Ludox" colloidal silica sols). With no base present product formation involves strictly an interaction of positive and negative ($SiO_2$) reagents; as the percentage of base increases in situ polymerization of added charged alumina increases and even stronger interaction with $SiO_2$ is promoted.

The upward adjustment of pH of a positive colloid dispersion causes a corresponding increase in viscosity until gellation or flocculation of aggregated active material occurs. At a solids level above about 30%, gellation or flocculation can occur at a pH of 5 or below. At a solids level of about 15%–30%, gellation or flocculation can occur at a pH of 6 or below. At a solids level of about 5%–15%, gellation or flocculation can occur at a pH about about 6–7. In the practical performance of this invention, adjustment of pH is made short of the point of gellation.

Upward adjustment of pH of positive sols affects not only their physical properties but also their activity toward negative substances. By increasing pH, polymerization of charged alumina is increased proportionately and the charge attraction of these polymer species toward silica is enhanced. This stronger interaction of positive and negative substances results in higher viscosity, sooner and speedier gel formation and faster development of ultimate properties of final compositions than at lower pH's.

Upward adjustments of pH on positively charged colloid dispersions usually are made with alkaline or alkaline earth bases or ammonia, although ion exchange resins are quite effective and can be employed, if desired. Equivalent amounts of base, alternatively, can be added to the negative colloid dispersions, of course. No benefits are derived in adjusting positive or negative sols and solutions to lower than normal pH values.

Product properties depend to some extent upon mixing conditions. High shear mixing tends to give higher viscosity than low shear agitation at a given solids ratio. The effect of type of mixing is shown below.

| Positive-negative material | Type of mixing | Low viscosity, fluid +/− solids ratio | Soft, mobile gel +/− solids ratio | Firm gel +/− solids ratio |
|---|---|---|---|---|
| Positive sol 130M (30% SiO$_2$ plus Al$_2$O$_3$) | High shear | 5.6:1 | 4.1:1 | 3.2:1 |
| "Ludox" HS 40 (40% SiO$_2$) | Low shear | 2:1 | 1.4:1 | 1:1 |

This table also shows that products varying from liquids to firm gels can be obtained by varying the ratio of negative and positive components. Many gradations in properties between these two extremes are possible through selection of reagent type and ratio and "stabilities" vary markedly between character limits. Fluid, viscous, up to soft gel mixtures tend to retain mobility or deformability for appreciable periods of time after formation and can, therefore, be incorporated into compositions which can be poured, spread, extruded, molded, etc., without adversely affecting final dry strength, green or fired. From soft gels up to firm gels is a progression toward mixtures which cannot be disturbed after preparation, without serious reduction of ultimate strength and other useful properties, a behavior well known in the art of gel formation.

It is thus possible to tailor a mix to an end use, to control whether it is to set (gel) slow, medium or fast or not at all and to have useful properties such as thixotropy, plasticity, moldability, etc. If a mix has a reasonable life or period of mobility before gellation, such as fluid-to-soft gel types, simple techniques for combining positive and negative coactants can be used; preferably, the negative material is added to the positive with some agitation, whether it be hand or mechanical. If a mix has little or no life before "hard" gel formation, techniques are more sophisticated and important—essentially, positive and negative substances are combined in precise final-composition proportions and rapidly homogenized. Methods known to the art are described below.

Refractory filler materials

The products of the reaction of the positive and negative colloids are the matrices of many of the final compositions of this invention and require the presence of fillers to give the desired useful characteristics. The matrices of this invention formed by the interaction of positively and negatively charged sols can contain up to 90% by weight refractory filler material.

Filler materials for this invention can be refractory grains and fibers, metal powders and pigments. Clays and expanded clays are useful fillers providing they contain low percentages of ions such as $CA^{+2}$ and $SO_4^{-2}$ which can be deleterious to the stabilities of the positive and/or negative sols, and insufficient basic compounds such as alkaline and alkaline earth metal hydroxides or oxides to cause gellation or precipitation of the positive sols. Refractory grains and fibers and pigments must also satisfy these requirements and metal powders must be compatible with the acidic or basic nature of the sols, or effective passivating agents must be used. Of course, if a filler is compatible with one sol (positive or negative), it can be employed in that commodity and another innocuous material can then be used with the oppositely charged sol. Generally, if the above precautions are followed, there is no problem in mixing fillers or using different fillers, particulate or fibrous.

A wide variety of particulate refractory materials are suitable for this invention. Examples are alumina-hydrated, calcined and tabular types; amorphous and crystalline silica; mica; boron nitride; zircon; mullite-synthetic and material produced by calcining minerals such as kyanite and sillimanite, also fused and raw mullite; aluminosilicates such as kyanite, molochite, and sillimanite; silicon carbide; ferrites; chromites; graphite; beneficiated clays, raw, fused and expanded. Less refractory materials which contain various percentages of alkali and alkaline earth metal oxides and other metal oxides can be used in some applications, if desired. Examples of pigments are titanium dioxide, chromium oxide and iron oxides.

Metal powders useful in this invention, for example, are stainless steel, aluminum, nickel and chromium; a large number of these are commercially available.

Fibrous materials useful in this invention can be the commercial aluminosilicate fibers such as Fiberfrax and Kaowood, as the bulk fiber or chopped or ball milled forms, fiber glass of various fiber lengths, wollastonite (calcium silicate), fibrous potassium titanate, carbon and metal fibers and whiskers. Also useful in some applications can be asbestos fibers and fibers produced from fused clays and other minerals which contain varying percentages of alkali and alkaline earth metal oxides.

Filler materials for this invention are usually incorporated into the negative and positive sols. It is possible, however, to coat filler materials with charged agents and use them in the performance of this invention. For example, a refractory grain can be coated with negative colloidal silica and combined with a mixture of a filler dispersed in a positive sol to give a useful product. In this way less water is present in the component mixture, which has decided obvious advantages in many applications.

Mixture preparations

Techniques for preparing the mixtures of filler and positive and/or negative sols are well known in the art and will be discussed only briefly.

Usually, 50–75% by weight of filler can be added rapidly to solutions or sols using efficient mixing equipment. The remainder is added more slowly. Mixtures can be ready for use within a few hours or less. It is best that shear not be excessive such that the slurry overheat by friction; an optimum temperature range to maintain is 75–85° F.

Prolonged stirring may be required to remove entrapped air or a vacuum degassing system can be employed.

Generally, a Lightnin® mixer is satisfactory for fluid refractory grain mixtures. Where bulk fiber is used, a Hobart® mixer is effective in incorporating material. For preparing very viscous mixes, any of a number of "dough" mills are highly efficient.

Additives can be useful in preparing filler-reagent mixtures. Hydroxyacetic acid added to positive sols at a level of about 2% (70% practical grade) of the sol weight acts to complex ionic impurities and/or interact with base leached from material which have a destabilizing effect on the sol. Wetting agents, such as Pluronic Nonionic TMN and Hydrodyne at a level of 0.05–0.1% of the positive or negative sol weight provide improved flowability and wetting of substrates if needed.

Other additives which can be used to modify the characteristics of the reagent mixtures or final products are polymer lattices, clays, cellulosic materials, asbestos, gums, rosins, etc. These may serve to alter viscosity, give improved green strength or give added porosity after they are burned out, for example.

Final compositions produced by combining negatively charged and positively charged mixtures can have a broad spectrum of properties and uses as described next.

MONOLITHIC COMPOSITIONS

Useful compositions of this invention can be divided into four principal types:
(A) Adhesives
(B) Coatings
(C) Shaped refractories
(D) Refractory molds

(A) Adhesives

In the table presented earlier in this case it is shown that certain ratios of positive-to-negative reagents give fluid, stable mixtures. It is these low viscosity mixtures which are useful in formulating long-lived adhesives compositions by incorporating fibrous and particulate material to give desired flow, spread and other characteristics.

It is possible to prepare adhesives with excellent green and fired strengths for joining refractory objects. Processing simply entails making up the positive-negative "vehicle" with mild, efficient stirring—adding negative to positive solutions or sols—then working in fiber and/or grain to give the desired consistency and properties.

Also, the "vehicle" can be used as a reinforcing, strengthening or bonding agent for pre-formed refractory fiber and grain shapes. The "vehicle" can be soaked or drawn under reduced pressure into the object and allowed to dry. Because of optimum rheological properties there is no tendency toward migration of binder or drydown.

(B) Coatings

Two types of coatings systems based upon the technology of this invention are possible.

The first, a slow setting kind, utilizes long-lived mixtures of positive and negative reagent sols such as employed for adhesives. Referring to the table above, ratios of positive-to-negative agents useful for this application extend from those which give low viscosity mixtures up to semi-gels, with the provision that there be some appreciable working life following mixing. Here, there is less dependency upon chemical setting and more upon drying to "set" or solidify a coating than in the next system to be discussed. In the slow curing system fiber and/or grain are added to the positive-negative "vehicle" to give the desired properties for application by brush, trowel, spatula or other techniques to substrates for purposes which are described below.

In the second system, positive and negative reagent sols are mixed separately with fillers to give sprayable mixtures. Ratios of positive-to-negative agents are selected so that gellation occurs within a very short period of time after the mixtures are combined. A dual spraying outfit is used to project the individual mixtures simultaneously toward a surface so that they blend at some point short of the surface and the composition sets upon reaching the surface. The advantage of such a system is that thick coatings can be rapidly built up on a vertical surface without sagging. Coatings cure to firm self-supporting structures within very short times. In the first system thick coatings are build up in multiple layers with drying between.

Coatings compositions prepared according to the processes of this invention can be employed as heat reflective, thermal shock-resistant, insulative coatings of broadly variable densities for many substrates. Representative of useful applications are refractory coatings for equipment in the basic metal and foundry industries for production, pouring and transportation of molten metal; backup coatings for less refractory materials—e.g., clays, metals—to enable them to be used at high temperatures; coatings on structural steel for insulation against warpage by fire.

In addition, the spraying technique can be employed to rapidly build refractory molds on expendable patterns for precision investment casting of metals and to form molds on permanent patterns for metals casting.

Included as coatings rather than classed as ceramics are ramming and gunning mixes for the patching and lining of furnaces, kilns, furnace hearths, boilers, stacks, hot gas ducts, large cylindrical vessels, hoppers, irregular contoured areas and foundry accessory equipment. Generally, these are mixes which require heat for setting. Using rapid-set compositions that can be formulated according to the teachings of this invention, patching and lining can be accomplished without the use of heat, a highly desirable feature in many instances. In this process, equipment proportionately mixes and immediately directs the rapid-setting composition against the substrate. Operations can be conducted very rapidly to give rigid monolithic patches and linings which can be further cured with heat if desired.

(C) Shaped refractories

By proportioning positive and negative reagent-based mixtures as shown in the table and utilizing other variables such as pH and percent filler loading and filler type, compositions useful for producing refractory objects. Compositions can be slow enough setting to allow some handling time or very rapid-setting where speed is important.

A variety of processing techniques common to the ceramics industry as well as plastics and other industries can be utilized in manufacturing shaped refractory objects using the compositions of this invention. Simple mixing of reactive components can be used if the mixture has sufficient working life. Mixtures then can be shaped and allowed to set, with or without the aid of heat. Where the proportion of components is such that setting is fast, the processing equipment must accomplish both rapid, efficient mixing and shaping. Representative of processing techniques are: Casting and Molding—material is poured into a mold if there is time, or short-lived mixtures are rapidly prepared and forced into a mold cavity by machinery. Vacuum and pressure forming, centrifugal casting, compression molding, rotational molding, injection molding are all useful techniques. Residence time of material in the mold depends upon the composition of the mixture. Time may be a matter of seconds or minutes before the object can be removed for further curing; heat will shorten residence time.

Controlled set time in a mold, less residence time in a mold, increased production and labor savings, improved wet and early high green strengths of objects, ease of handling casting mixes are benefits realized with this unique system. In some instances these systems can replace slip casting; permanent molds can be utilized instead of expensive, limited-life plaster of paris molds.

Useful products obtained through this invention are, for example:

Refractories—specialized units for metals industry uses (linings for furnaces stacks, ducts; tubes, runners, ingates, pipes, crucibles, funnels, nozzles, muffles, etc.) in production, alloying, casting and heat-treating of metals; for petroleum industry in the recovery of petroleum products from oil; for furnaces for steam power; in the production of gas; for kilns for ceramic production and for kiln furniture; for incinerators; for household burners.

Structural ceramics—special brick and other units for building, facing, acoustical, lining, decorative purposes.

White wares—artware, decorative and utilitarian.

Ceramics for electrical and electronic uses—potting of electrical and electronic units; insulators; disc, tubular and cylindrical dielectrics; conductors and semiconductors; ceramics for wave guides, thermistors, thermo-electric devices, etc.

Cermets—composites of ceramic material and metal for specialized uses.

Cores for use in precision casting of metals. Extrusion—quick-seting material is rapidly prepared and extruded into pipe, tubes and other shaped objects in a continuous mechanical operation. Objects can then go through air drying and heating steps, often on a continuous basis.

(D) Refractory molds

Refractory molds for the casting of metals can be prepared by a number of methods, utilizing the compositions of this invention. Rapid setting mixes can be sprayed or cast onto permanent patterns, allowed to set and removed for further curing. It is also possible to cast a mixture about a wax or plastic pattern, allow the mix to cure dry and remove the pattern with heat; this is known as the "flask" or "bottle" technique for preparing investment casting molds.

The above methods are also useful in making hot forming dies for heat treating and forming stainless steel, titanium and other metal shapes.

Materials especially useful for inclusion in compositions for preparing molds from permanent patterns and for dies are graphite and metal powders which appreciably increase heat conductance.

The following examples further illustrate this invention. All parts and percentages are by weight unless otherwise stated.

EXAMPLE 1

An adhesive composition useful for joining refractory objects is prepared as follows. Two thousand grams of Positive Sol 130M (30% $SiO_2$, $Al_2O_3$) is placed in a Hobart mixer kettle and stirred at medium speed with a wire beater as 800 g. "Ludox" HS-40 (40% $SiO_2$) is added in about one minute. The mix is stirred for ten minutes longer and 200 g. bulk Fiberfrax ceramic fiber is added in about five minutes in small pieces. Beating at medium speed is continued for ten minutes to give a smooth, stiff paste which does not change in properties for months. Upon drying and firing this adhesive forms a strong bond between refractory shapes.

EXAMPLE 2

Example 1 is repeated with 1065 g. of "Ludox" SM-30 (30% $SiO_2$) in place of "Ludox" HS-40.

EXAMPLE 3

Example 1 is repeated with 1065 g. of "Ludox" AM (30% $SiO_2$) in place of "Ludox" HS-40.

EXAMPLE 4

Example 1 is repeated with 1065 g. of "Ludox" AS (30% $SiO_2$) in place of "Ludox" HS-40.

EXAMPLE 5

A vertical surface of non-refractory material is given a ¼" thick refractory coating composition of this invention.

Two slurries are prepared:

Slurry 1: G.
  Positive Sol 130M (30% $SiO_2$, $Al_2O_3$) _____ 2900
  200 mesh fused silica flour _____ 6500
Slurry 2:
  "Ludox" HS-30 (30% $SiO_2$) _____ 2250
  200 mesh fused silica flour _____ 8100

Slurries are stirred for 24 hours after preparation before use.

A dual spraying outfit is employed to combine sprays of Slurry 1 and Slurry 2 in a 3:1 ratio at a point one foot from the nozzles, then impinge the mixture on the substrate. The composition sets rapidly after reaching the surface without sagging and upon drying gives a strong refractory coating.

EXAMPLE 6

A ceramic mold of this invention is formed on a pattern.

Two slurries are prepared:

Slurry 1: G.
  Positive Sol 130M (30% $SiO_2$, $Al_2O_3$) _____ 1250
  325 mesh zircon flour _____ 3650
  Milled Fiberfrax fibers _____ 100
Slurry 2:
  "Ludox" SM-30 (30% $SiO_2$) _____ 1250
  325 mesh zircon flour _____ 2400
  Milled Fiberfrax fibers _____ 100

Slurries are stirred for 24 hours after preparation before use.

A dual spraying outfit is employed as in Example 5 to combine slurry 1 and slurry 2 in a 2:1 ratio at a point about one foot from the nozzles. The mixture then is evenly coated onto the two halves of a wooden pattern mold to a thickness of about ½". The composition sets up rapidly and can be removed from the patterns within minutes for further drying and firing. The assembled mold gives a perfect stainless steel casting.

EXAMPLE 7

Ceramic cores useful in precision investment casting are prepared according to a method of this invention.

Two high viscosity mixtures are prepared:

Mixture 1: G.
  Positive Sol 130M (30% $SiO_2$, $Al_2O_3$) _____ 2,500
  325 mesh fused silica flour _____ 10,500
  Chopped fiber glass fibers _____ 200
Mixture 2:
  "Ludox" HS-30 (30% $SiO_2$) _____ 2,500
  325 mesh fused silica flour _____ 10,500
  Chopped fiber glass fibers _____ 200

Mixtures are prepared by slowly adding the flour and fibers to the sols in a Hobart mixer kettle, using slow speed stirring. Stirring is continued for 30 minutes after material is added.

An injection molding machine which meters equal weight charges of mixtures 1 and 2, rapidly and efficiently combines them and injects the composition into warm multiple core mold cavities is used in this invention. The rapid-setting shaped ceramics can be removed from the molds within a very short time for drying and firing.

EXAMPLE 8

Refractory pipe useful in conducting molten aluminum metal is formed according to a method of this invention.

Mixtures 1 and 2 of Example 7 are used in the continuous production of pipe. The mixtures are metered in equal weight proportions, rapidly and efficiently combined and extruded into pipe using specialized auger extrusion machinery. Continuously, the pipe is dried and fired.

EXAMPLE 9

A casting mixture useful for forming shaped refractory objects is prepared according to a method of this invention.

A slurry is prepared by dispersing 2000 g. 325 mesh, 2000 g. 100 mesh and 2000 g. 30 mesh T-61 tabular alumina grains (Alcoa) in 600 g. Positive Sol 130M (30% $SiO_2$, $Al_2O_3$) using a Lightnin® mixer at low speed. The slurry is stirred for 24 hours before use.

Using high shear agitation with the Lightnin® mixer, a mixture of 150 g. "Ludox" SM-30 (30% $SiO_2$) and 600 g. 325 mesh T-61 tabular alumina is added to the slurry and the mixture is immediately poured into a vibrated mold. The object can be removed for drying and firing within 30 minutes to give a crack-free, high-strength product.

EXAMPLE 10

A metal-refractory grain composite composition of this invention useful for casting a die for hot forming of metals is prepared as follows.

A mix is prepared by adding 540 g. stainless steel powder and 540 g. 325 mesh tabular alumina to 120 g. "Ludox" HS–40 (40% $SiO_2$) with efficient stirring. This is added to a mixture of 480 g. Positive Sol 130M (30% $SiO_2$, $Al_2O_3$), 2000 g. stainless steel powder and 2000 g. 325 mesh tabular alumina with high shear and the composition is rapidly spread over a plastic form. The composition stiffens rapidly and can be removed from the form within a short time, dried and fired to give a defect-free die.

We claim:

1. A homogenous composition comprising negatively charged colloidal silica particles and positively charged colloidal particles of polyvalent metal oxygen compounds coated over a silica core, the weight ratio of positively charged colloidal particles to negatively charged colloidal silica particles being from 1:2 to 6.5:1.
2. A composition of claim 1 comprising a matrix of a sol of positively charged colloidal particles homogeneously mixed with a negatively charged colloidal silica sol.
3. A gel comprising the composition of claim 2.
4. A dispersion comprising the composition of claim 2.
5. The composition of claim 1 wherein the positively charged colloidal particles consist essentially of a silica core coated with a polyvalent metal-oxygen compound.
6. The composition of claim 2 wherein the positively charged colloidal particles consist essentially of a silica core coated with a polyvalent metal-oxygen compound.
7. The composition of claim 1 wherein the positively charged colloidal particles are alumina-coated silica.
8. The composition of claim 2 wherein the positively charged colloidal particles are alumina-coated silica.
9. The composition of claim 1 containing inert particulate filler material.
10. The composition of claim 1 containing inert fibrous filler material.
11. The composition of claim 2 containing up to 90% by weight filler material.
12. A refractory mold comprising the composition of claim 1.
13. A refractory mold comprising the composition of claim 9.
14. A shaped refractory comprising the composition of claim 1.
15. A shaped refractory comprising the composition of claim 9.

References Cited

UNITED STATES PATENTS

| | | | |
|---|---|---|---|
| 3,252,917 | 5/1966 | Mindick et al. | 252—313 S |
| 3,445,250 | 5/1969 | Preece | 106—69 |
| 3,507,944 | 4/1970 | Moore | 106—57 |

OTHER REFERENCES

Hazel, Mobility Studies With Colloidal Silicic Acid, J. Phys. Chem., vol. 42, pp. 409–414, 1938.

JAMES E. POER, Primary Examiner

U.S. Cl. X.R.

106—69